US012400188B1

(12) United States Patent
Grifno et al.

(10) Patent No.: US 12,400,188 B1
(45) Date of Patent: Aug. 26, 2025

(54) HIGH-COST MEDICAL CLAIM PREDICTION AND NAVIGATION ENGINE

(71) Applicants: Ken Grifno, Fayetteville, AR (US); William McCallum, Fort Worth, TX (US); Jack McCallum, Benbrook, TX (US); Scott Roloff, Arlington, TX (US)

(72) Inventors: Ken Grifno, Fayetteville, AR (US); William McCallum, Fort Worth, TX (US); Jack McCallum, Benbrook, TX (US); Scott Roloff, Arlington, TX (US)

(73) Assignee: Integer Health Technologies, LLC, Arlington, TX (US)

(*) Notice: Subject to any disclaimer, the term of this patent is extended or adjusted under 35 U.S.C. 154(b) by 0 days.

(21) Appl. No.: 18/645,749

(22) Filed: Apr. 25, 2024

(51) Int. Cl.
*G06Q 40/00* (2023.01)
*G06Q 10/1057* (2023.01)
*G06Q 40/08* (2012.01)

(52) U.S. Cl.
CPC ......... *G06Q 10/1057* (2013.01); *G06Q 40/08* (2013.01)

(58) Field of Classification Search
CPC .......................... G06Q 10/1057; G06Q 40/08
See application file for complete search history.

(56) References Cited

U.S. PATENT DOCUMENTS

| | | | | |
|---|---|---|---|---|
| 8,290,796 B1* | 10/2012 | Kruckeberg | ........... | G06Q 30/00 705/4 |
| 11,257,018 B2* | 2/2022 | Servidone | ............. | G06F 16/904 |
| 11,848,109 B1* | 12/2023 | Alchemy | ............... | G16H 15/00 |
| 2008/0040149 A1* | 2/2008 | Joao | ........................ | G06Q 40/00 705/322 |
| 2011/0015949 A1* | 1/2011 | Ruszala | ................. | G06Q 40/08 705/34 |
| 2012/0130751 A1* | 5/2012 | McHugh | ................ | G06Q 40/08 705/500 |
| 2014/0058758 A1* | 2/2014 | Hollingsworth | ....... | G06Q 40/08 705/4 |
| 2014/0108057 A1* | 4/2014 | Daniels | .................. | G06Q 40/08 705/4 |

(Continued)

OTHER PUBLICATIONS

Reengineering claims processing using probabilistic inductive learning; IEEE Transactions on Engineering Management (vol. 46, Issue: 3, 1999, pp. 335-345); Aug. 1, 1999; R.G. Arunasalam, J.T. Richie, O. Gur-Ali, W.A. Wallace, W. Egan. (Year: 1999).*

*Primary Examiner* — Tien C Nguyen
(74) *Attorney, Agent, or Firm* — James H. Ortega; Vincent J. Allen; Carstens, Allen & Gourley, LLP (57) ABSTRACT

A prediction and navigation engine that identifies in real-time new workers' compensation cases likely to be high-cost-sometimes referred to as outliers. The engine employs artificial intelligence (AI), machine learning (ML) and natural language processing (NLP) on the initial entries of the adjuster notes to do so, sending a warning back to the program or system into which the adjuster is typing those notes if the engine identifies the case as a potential outlier. The engine then predicts the likely costs of each new case, whether a potential outlier or not, by comparing the keywords, phrases and text that the adjuster uses in the initial notes for that new case, combined with any other available information, against the adjuster notes and actual costs of similar historical cases in the engine's library.

10 Claims, 6 Drawing Sheets

Navigation System on Monitor Screen

(56) References Cited

U.S. PATENT DOCUMENTS

| | | | |
|---|---|---|---|
| 2014/0278566 A1* | 9/2014 | Mclaughlin | G06Q 40/08 705/4 |
| 2015/0242956 A1* | 8/2015 | Schultz | G06Q 40/08 705/4 |
| 2016/0104246 A1* | 4/2016 | McLaughlin | G06Q 10/1057 705/4 |
| 2016/0125544 A1* | 5/2016 | Edwards | G06Q 10/1057 705/4 |

* cited by examiner

HIGH-COST MEDICAL CLAIM PREDICTION AND NAVIGATION ENGINE

RELATED PATENT & APPLICATIONS

This disclosure is related to U.S. Pat. No. 11,809,676 B2, entitled "Tree Frog Computer Navigation System for the Hierarchical Visualization of Data," issued Nov. 7, 2023, which is incorporated by reference herein in its entirety.

This disclosure is also related to the following patent applications, each of which is incorporated by reference herein in its entirety: (1) U.S. patent application Ser. No. 17/855,694, entitled "Wellness Program Navigation Engine," filed Jun. 30, 2022; (2) U.S. patent application Ser. No. 17/864,631, entitled "Healthcare Occupational Outcomes Navigation Engine," filed Jul. 14, 2022, which is a continuation-in-part of U.S. patent application Ser. No. 15/225,503, filed Aug. 1, 2016, which claims the benefit of U.S. Patent Application No. 62/387,534, filed Dec. 28, 2015; (3) U.S. patent application Ser. No. 17/968,296, entitled "Healthcare Clinical Efficiency Claims Per Healthy Day Navigation Engine," filed Oct. 18, 2022, which is a continuation-in-part of U.S. patent application Ser. No. 16/031,559, filed Jul. 10, 2018; and (4) U.S. patent application Ser. No. 18/500,955, entitled "Tree Frog Computer Navigation System for the Hierarchical Visualization of Data," filed Nov. 2, 2023, which is a continuation of patent application Ser. No. 15/950,681, filed Apr. 11, 2018.

TECHNICAL FIELD

A method and/or system that is a navigation engine to: (1) identify keywords, phrases and text in the initial entries of the adjuster notes for historical workers' compensation cases that correlate with subsequent high-cost medical claims and/or high-cost lost-wage indemnity payments (outliers), as well as such keywords, phrases and text that correlate with subsequent non-high cost cases (non-outliers), with the threshold for outliers set by the user; (2) interface with the program and/or system into which adjusters input their notes on new workers' compensation cases and predict in real-time the medical claim costs and lost-wage indemnity payments on each such case based on the keywords, phrases and text that the adjuster uses in the initial note entries based on the historical costs of similar workers' compensation cases; and (3) send a warning back to the program and/or system into which adjusters input their notes on those new workers' compensation cases that the engine flags as potential outliers.

BACKGROUND

Workers' compensation is a state statutory regime that provides medical benefits and indemnity payments for an employee injured at work, without regard to fault.

The employer is responsible for providing these medical benefits and indemnity payments, either through purchasing workers' compensation insurance or self-insuring. In exchange, the employee cannot sue the employer for negligence in connection with the employee's injury.

The indemnity payments include lost-wage indemnity payments to compensate the employee for the work that they miss while injured and lump-sum indemnity payments for permanent disability, such as the loss of a limb.

When an employer purchases workers' compensation insurance (i.e., fully-insures) the employer pays premiums to an insurance company and the insurer is responsible for the injured employee's medical benefits and indemnity payments.

When an employer self-insures the employer remains responsible for those benefits and payments. In this case, the employer engages a third-party administrator (TPA) to perform the administrative functions that the insurer would provide in the fully-insured scenario, such as maintaining a network of healthcare providers to treat the injured employee and processing their medical claims.

A person at the insurer or TPA (or sometimes the self-insured employer), usually called an "adjuster" and so referred to in this disclosure, will be assigned to handle each workers' compensation case.

As soon as an injury is reported and assigned, the adjuster will open a file for the case and begin documenting what occurred (i.e., the adjuster notes), including describing the injury.

Some cases will have medical claim costs and lost-wage indemnity payments much higher than typical for similar injuries. These cases are referred to as "outliers," sometimes defined as cases with costs three or more standard deviations above the mean.

During the first days and weeks following an injury, the medical claim costs for the procedures and care for outliers tend to be more front-loaded than a normal injury, resulting in high costs during this period. This higher cost trajectory then continues throughout the course of the case.

There is a 30-60 day lag between when a healthcare provider performs a procedure and/or renders care and when the insurer or TPA processes the claim and pays it.

The adjuster, insurer, TPA and/or self-insured employer therefore does not become aware of outliers until after a significant amount of medical claim costs have occurred and courses of treatment locked in-too late to do anything about them.

If they knew about injuries that were potential outliers in the first days and weeks after the injury they might be able to intervene to prevent them from becoming outliers. Such intervention could take various forms, including sending the injured employee to the best possible surgeon for that type of injury, even if that surgeon is out-of-state, or enrolling the employee in a one-on-one support program with a counselor specializing in helping employees recover from that type of injury. At the very least, the adjuster could monitor the case closely, shifting strategy if the case begins to wobble.

The prediction and navigation engine described herein solves the time lag problem.

Using the early entries in the adjuster notes, the engine identifies potential outliers in real-time based on the keywords, phrases and text that the adjuster uses to describe the injury as the adjuster types them.

SUMMARY

A method and/or system consisting of a prediction and navigation engine that identifies in real-time new workers' compensation cases likely to be high-cost-sometimes referred to as outliers.

The engine has a library of historical workers' compensation cases, including for each case the adjuster notes, medical claim costs and lost-wage indemnity payments. The library may also contain other data sets.

The engine trains on the library, using artificial intelligence (AI), machine learning (ML) and natural language processing (NLP) to identify the keywords, phrases and text in early adjuster note entries that correlate with cases that subsequently turned out to be outliers or not, whether in terms of medical claim costs, lost-wage indemnity payments or both.

For both the outliers and non-outliers, for each type of injury the engine determines the average medical claim costs and lost-wage indemnity payments. Alternatively, the engine may express these amounts as ranges. Based on available information, the engine may refine these averages and ranges on a more granular level. For example, instead of the average medical claim costs for a knee injury that is an outlier, the average medical claim costs for a knee injury that is an outlier where the employee is a 30 year-old male who has diabetes working in a job that requires manual labor.

Having trained on the library, the prediction and navigation engine interfaces with the program or system into which the adjusters input or type their notes on new cases.

As an adjuster types their initial notes on a new case, the engine analyzes the notes as the adjuster types them to determine if the case is a potential outlier based on the keywords, phrases and text that the adjuster uses to describe the case. If identified as a potential outlier, the engine sends a warning back to the program or system into which the adjuster is inputting or typing their notes.

Based on the information in the library, the engine predicts the medical claim costs and lost-wage indemnity payments for each new case on the most granular level possible, whether flagged as a potential outlier or not, based on the keywords, phrases and text used in the initial note entries, and any other relevant information in the library.

BRIEF DESCRIPTION OF THE DRAWINGS

A complete understanding of the prediction and navigation engine may be obtained by referring to the accompanying drawings in conjunction with the following detailed description.

DETAILED DESCRIPTION

Various objects, features, aspects and advantages will become apparent from the following detailed description and accompanying drawings. The principles are described with specificity. This description and the drawings, however, are not intended to limit the scope of the principles disclosed herein. These principles might also be embodied in other ways and include different steps or combinations of steps similar to those described.

This disclosure describes a method and/or system that is a navigation engine to: (1) identify keywords, phrases and text in the initial entries of the adjuster notes for historical workers' compensation cases that correlate with subsequent high-cost medical claims and/or high-cost lost-wage indemnity payments (outliers), as well as such keywords, phrases and text that correlate with subsequent non-high cost cases (non-outliers), with the threshold for outliers set by the user; (2) interface with the program and/or system into which adjusters input their notes on new workers' compensation cases and predict in real-time the medical claim costs and lost-wage indemnity payments on each such case based on the keywords, phrases and text that the adjuster uses in the initial note entries based on the historical costs of similar workers' compensation cases; and (3) send a warning back to the program and/or system into which adjusters input their notes on those new workers' compensation cases that the engine flags as potential outliers.

Figure 1:
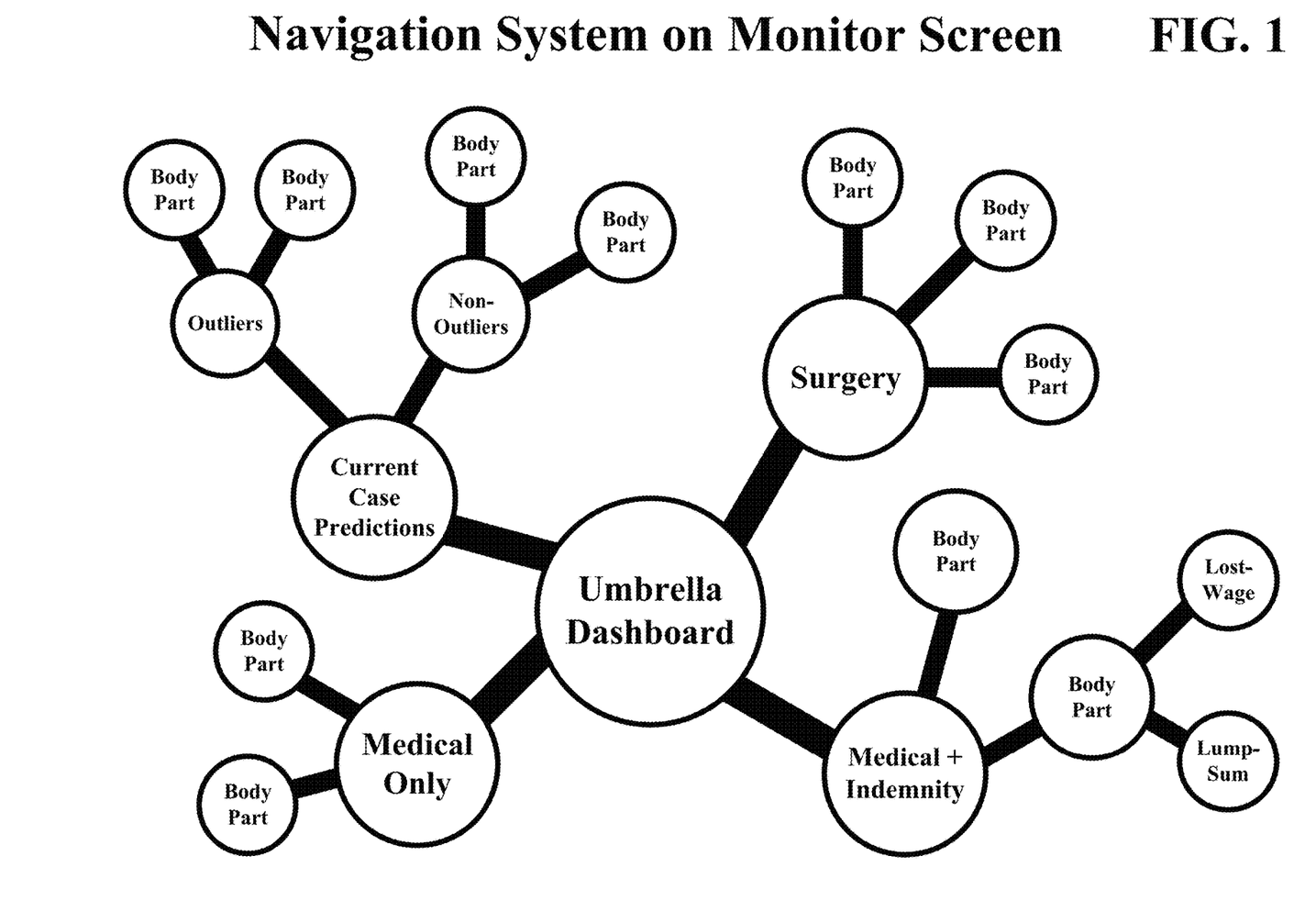
FIG. 1 shows how the prediction and navigation engine visually displays all the engine's data on the computer monitor at one time, arranging the data into categories and subcategories for easy retrieval by hoovering the computer mouse's cursor over the desired data and clicking on it.

The navigation engine is deployed on a computer connected to a monitor and mouse. As shown in FIG. 1, the engine employs the novel approach of representing categories and subcategories (and sub-subcategories, etc.) of material with functionally labeled circles or other images connected by stems in a hierarchical organization on a single computer screen. Descending circles in the hierarchy represent more detailed subsets of material. For example, major categories and their subcategories could be: (1) current workers' compensation cases—with subcategories for those injuries predicted to be outliers and those predicted not to be, with sub-subcategories under each by body part; (2) historical workers' compensation cases requiring surgery—with subcategories by body part; (3) historical workers' compensation cases on which there are both medical claims and indemnity payments—with subcategories by body part and sub-subcategories by type of indemnity payment, e.g., lost-wages or lump-sum; and (4) historical workers' compensation cases on which there are medical claims only and no indemnity payments—with subcategories by body part.

A circle may also be linked to the navigation engine and color coded based on the engine's analysis of the underlying data. For example, if the engine identifies new potential outliers the circle representing that category could be colored red to alert the user to that development.

Hovering the computer mouse's cursor over a circle displays thumbnails of the dashboards and reports available under it. The user can click on the circle for a category with the computer mouse to open that category, or click on a thumbnail of one of the dashboards or reports to open it directly.

The dashboards and reports for the cases and their medical claim costs, lost-wage indemnity payments and other expenses are interactive and may be organized and/or filtered by various metrics and/or combinations thereof, including outliers versus non-outliers, new cases versus historical cases, body part injured, periods, providers, job descriptions and/or functions, and employer locations and/or geographies.

The dashboards and reports may also contain conventional workers' compensation metrics, such as days to return-to-work, days to first provider visit, and days to surgery.

This navigation technology improves the computer's functionality by transforming the literal display of data into a visual one on a single computer screen; thereby improving computer and network performance by decreasing the resources used to open and close screens while searching for the right one, while increasing the effectiveness and speed of the user's search process.

Figure 2:
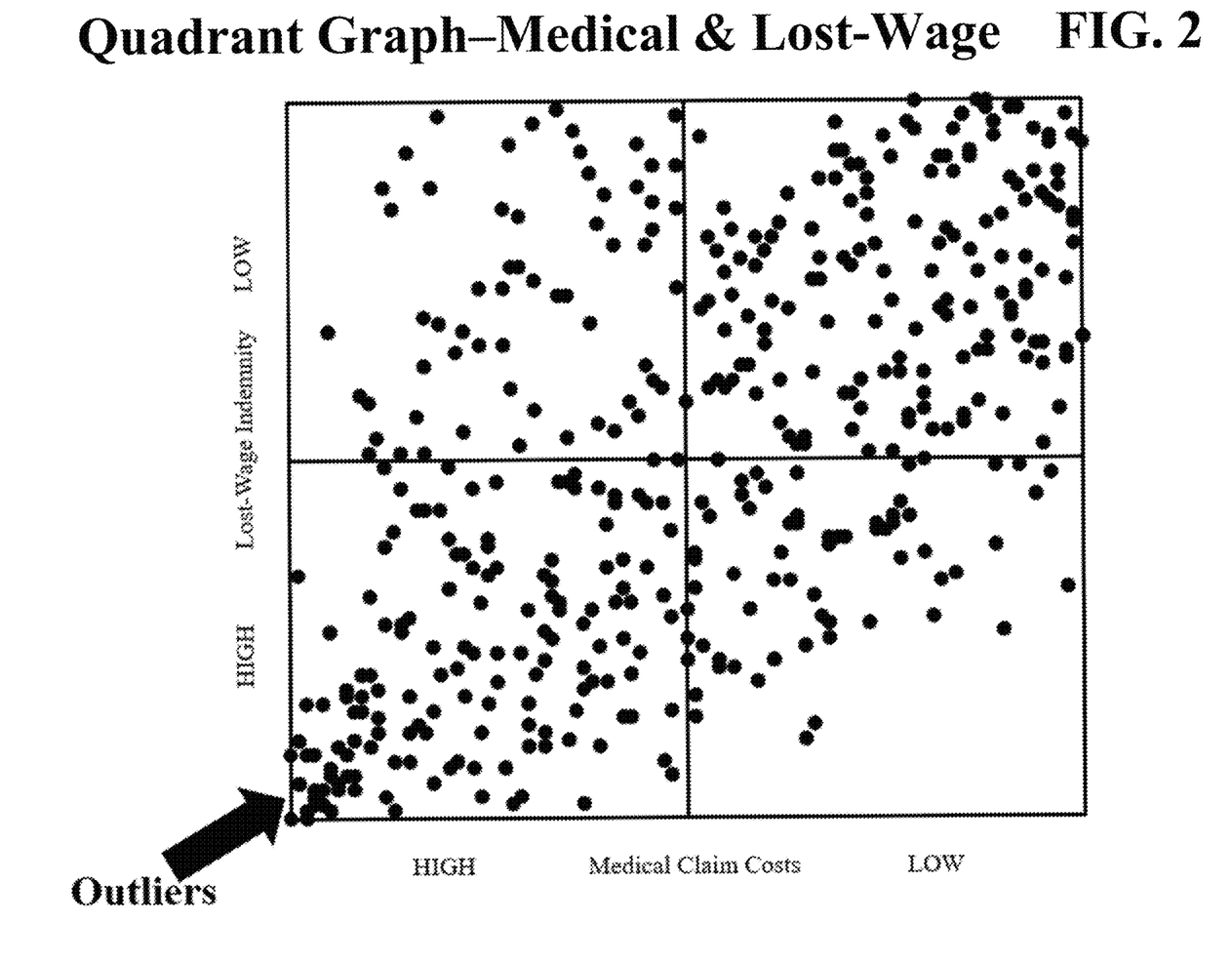
FIG. 2 shows how the medical claim costs and lost-wage indemnity payments for outliers compare to more normal workers' compensation cases.

FIG. 2 is a quadrant graph that shows how outliers compare to more normal workers' compensation cases. Workers' compensation cases have been graphed along the horizontal axis according to their medical claim costs, high costs on the left, low on the right. The cases have been graphed along the vertical axis according to their lost-wage indemnity payments, high at the bottom, low at the top. The outliers are along the outer boundary lines of the lower left quadrant—very high medical claim costs and/or very high lost-wage indemnity payments—with the most extreme outliers in the lower left corner of the quadrant.

The medical claim costs and lost-wage indemnity payments follow different patterns. The lost-wage indemnity payments move in a steady proportional fashion. Two months' of lost-wage indemnity payments are twice as much as one; four months' are twice as much as two. Although an outlier may have high lost-wage indemnity payments, those costs will not have an early spike so there is not an urgent need to address them in the first days and weeks after an injury. Similarly, lump-sum indemnity payments for things such as lost limbs are irrelevant to future costs because they accrue at the moment of the injury.

Figure 3:
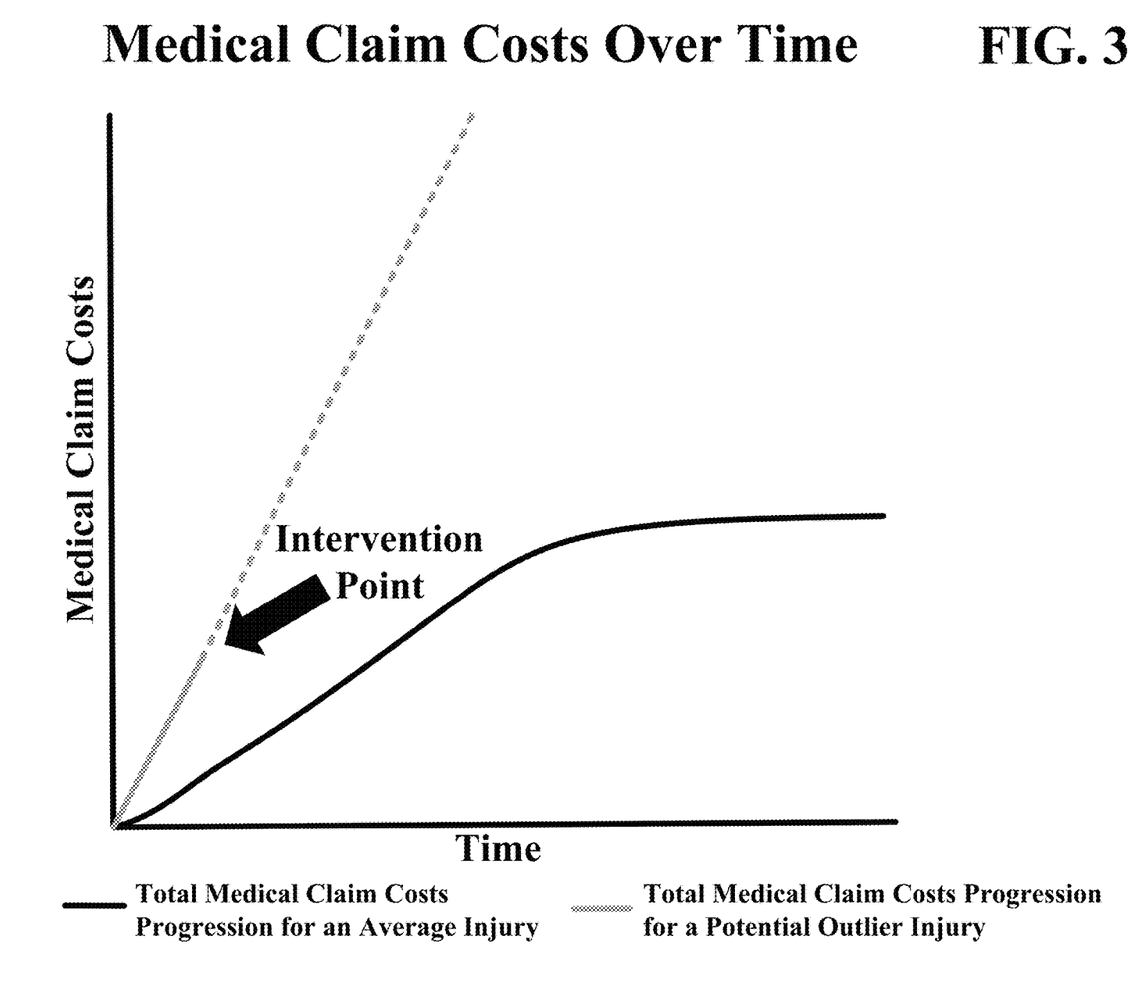
FIG. 3 shows the progression over time of the medical claim costs on an outlier versus a normal case, with the costs on the outlier spiking early in the first days and weeks after the injury.

The medical claim costs are different. They are front loaded—and the outliers even more so. FIG. 3 shows the progression over time of the medical claim costs on an outlier versus a normal case, with the costs on the outlier spiking early in the first days and weeks after the injury.

The adjuster must intervene in potential outlier cases during those first days and weeks to prevent them from becoming outliers. If the adjuster waits 30-60 days to receive the report on the medical claims processed for payment during that period it will be too late. A significant amount of medical claim costs will have already occurred, and treatment patterns locked in.

The prediction and navigation engine solves this problem by identifying potential outliers during this crucial period.

Figure 4:
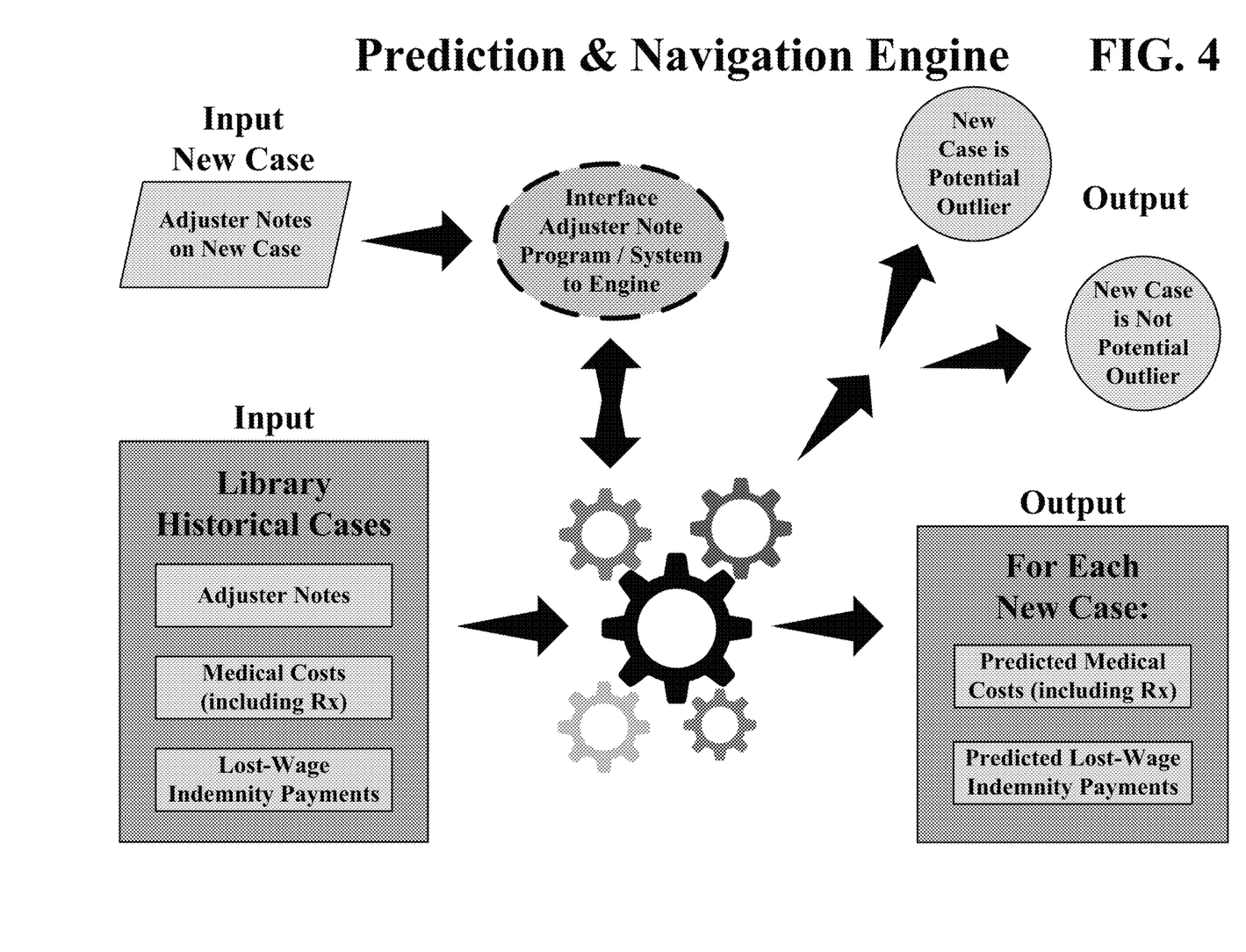
FIG. 4 shows the inputs into, and outputs out of, the prediction and navigation engine.

FIG. 4 shows the inputs and outputs of the prediction and navigation engine. The data input into the engine library is the historical workers' compensation data, including for each case the adjuster notes, medical claim costs, and lost-wage indemnity payments. Note that for purposes of this disclosure, medical claim costs include pharmacy (Rx) costs too.

The engine organizes the data in the library (and any other data that the engine uses) in databases arranged in tables and/or other schemas that permit the engine to extract and/or manipulate the data.

Figure 5:
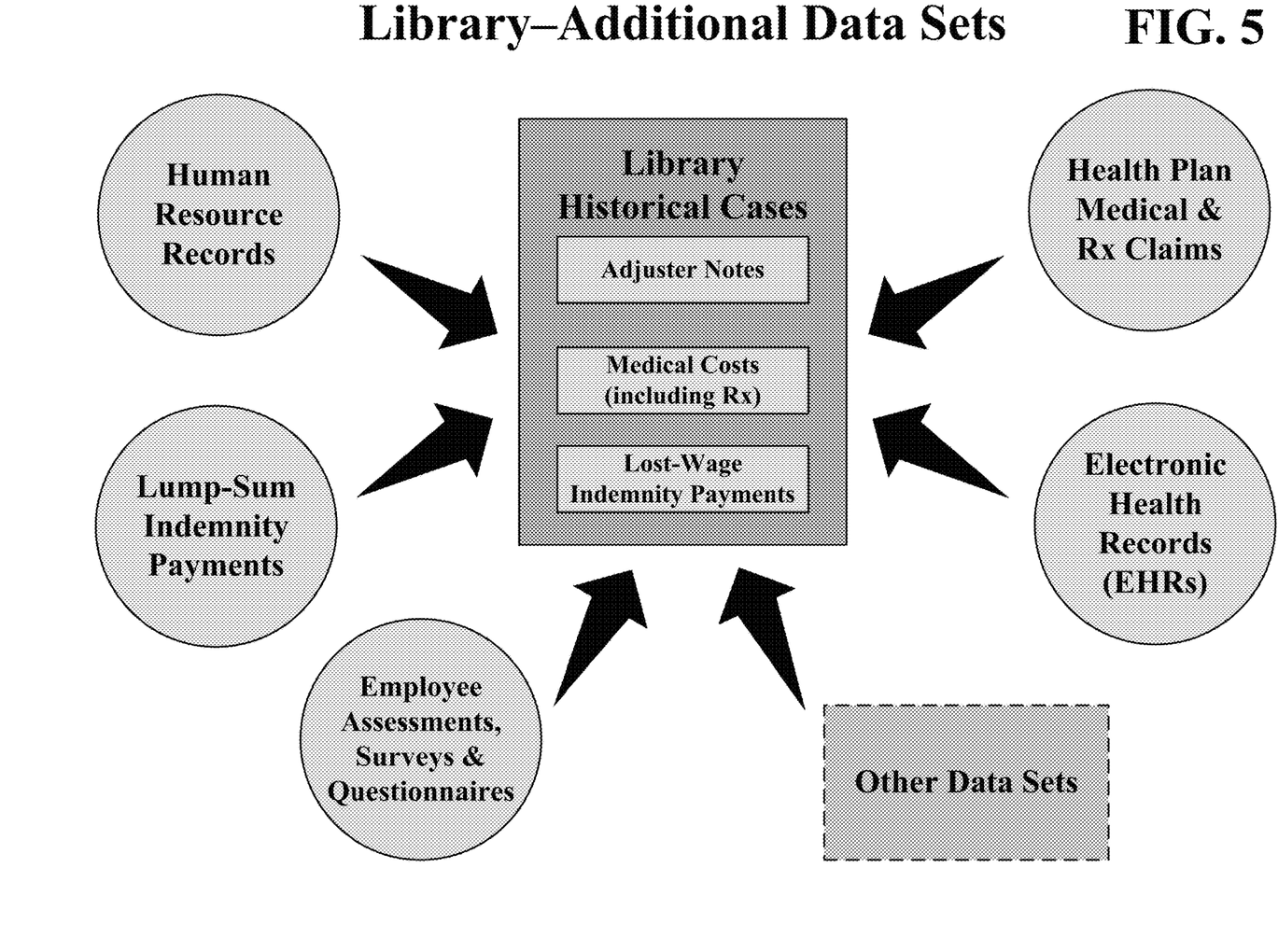
FIG. 5 shows a cut-out from FIG. 4 of the core historical case data in the prediction and navigation engine, referred to as the library, with examples of additional data sets that can be added to the library.

FIG. 5 shows a cut-out of the library with examples of other data sets that can be added to it to enrich the library and the engine's performance, including: (1) human resource (HR) records, which may contain information on the injured employee's age, sex, position/job description, salary or hourly pay rate, and hours of overtime worked (some of which may also be in the adjuster notes); (2) lump-sum indemnity payments; (3) employee health and other assessments, surveys and questionnaires; (4) health plan medical and pharmacy claims; (5) electronic health records (EHRs); and (6) other data sets.

Returning to FIG. 4, as each new workers' compensation case arises, that new case is analyzed by the engine as described below, and then added to the library where the engine re-runs its algorithms on the library as so updated.

The engine uses artificial intelligence (AI) to analyze the data in the library and perform the other functions described below. AI may be either rule-based AI, applying pre-programmed rules and logic to data, or generative AI, creating new things from the data. The engine may use both.

Specific AI technologies that the engine may use include: (1) machine learning (ML), which uses algorithms to recognize patterns in data sets; and (2) natural language processing (NLP), which uses algorithms to analyze text and identify keywords, phrases and text, understand context, extract entities and discern sentiment. The engine may also use a large language model (LLM), which is an AI technology that understands and generates human language.

To structure the adjuster notes and other text in the library, the engine may use a "bag-of-words" approach. This technique focuses on the presence or frequency of individual words without considering their context. The first step is tokenization, which breaks the text down into smaller pieces (called tokens), and the identification of delimiters, which are the special characters or symbols in a data set that separate different fields (e.g., commas, semi-colons, pipe symbols). The next step is stemming, which reduces multiple variants of a word to its root. An example would be converting "claims," "claimed" and "claiming" to "claim." The engine can then use frequency filters to ignore common words that appear in nearly all documents.

The engine trains on the library to identify the keywords, phrases and text that appear in the earlier entries of the adjuster notes for cases that subsequently became outliers, as well as for those that did not.

When constructing the engine's algorithms ensemble models may be used, which combine simpler base models into a more comprehensive one. Two ensemble models effective for imbalanced data sets, where there are fewer high-cost cases compared to normal-cost ones, are: (1) Random Forest, which builds a series of decision trees from the data; and (2) Gradient Boosting, which constructs a series of sequential models, with each successive model correcting the errors of the previous one.

After analyzing the library, the prediction and navigation engine will have discerned for each type of injury the keywords, phrases and text that appear in the early entries of the adjuster notes for injuries that subsequently turned out to be outliers, as well as for those that turned out not to be outliers (with the threshold for an outlier set by the user). The engine may either express this result as a simple binary conclusion (outlier or not outlier) or as a probability (i.e., a case with certain keywords, phrases and text in the initial adjuster entries has a 90% probability of turning out to be an outlier).

The engine will also have determined the average and/or probable range of the medical claim costs and lost-wage indemnity payments for each injury type, both on an overall basis for the outlier and non-outlier scenarios (i.e., average or range for all outliers and all non-outliers), and on a more refined basis based on the keywords, phrases and text used in the initial entries of the adjuster notes (e.g., average or range for an outlier with the keyword "tear," and for a non-outlier with the keyword "sore").

For a very simple example, on a knee injury in which the initial adjuster notes contain the terms "severe" and "ligament" in the same sentence, the notes indicate that the employee has retained a lawyer, and the overall sentiment expressed in the notes is negative, the engine may predict a 90% probability that the injury will be an outlier, and that for such outlier knee injuries the average medical claim costs would be $100,000 with another $50,000 in lost-wage indemnity payments.

As the predicted amounts are based on the historical costs in the library, the engine may step those amounts up for intervening inflation, as the examples in this disclosure are assumed to have done, e.g., a $10,000 cost three years ago with 3% inflation each year equates to $10,927 current year dollars.

Based on the data in the library, including the additional data sets shown in FIG. 5, the engine may refine the prediction. For example, upon considering the injured employee's age, sex, job description and recent overtime hours found in the HR records, the engine could predict that for a male between 30 and 40 years old with a job description including manual labor that worked 5-10 overtime hours in the week preceding the injury that the probability of an outlier jumps to 95%, with average medical claim costs of $125,000 and lost-wage indemnity payments of $75,000.

Most workers' compensation data sets will not contain comorbidity data. Comorbidities are chronic conditions that complicate a patient's recovery. For example, an injured employee with diabetes or obesity may cost more and take longer to recover from an injury than an employee without those comorbidities.

An individual's overall health and comorbidities can be encapsulated in a risk score. For example, an individual of normal health may have a risk score of 1.000, an individual healthier than normal a risk score lower than 1.000, and an individual sicker than normal higher than 1.000.

There are several risk-scoring systems available. An open-source risk-scoring system demographically appropriate for a working age population is HHS-HCC (Department of Health and Human Services-Hierarchical Condition Categories), which is used to calculate the payments to health insurers in the Affordable Care Act marketplace—the sicker someone is, the more the government pays the insurer to undertake the risk of insuring them.

If the workers' compensation data set contains comorbidity data, or comorbidity data can otherwise be added to the library, the engine could further refine the prediction, both as to the probability that the case will be an outlier and its predicted costs. The engine could use either a risk-scoring system or its own algorithms to do so. Continuing the above example, if the employee is obese the probability that the case will be an outlier could jump again to 97%, with average medical claim costs of $150,000 and lost-wage indemnity payments of $100,000.

Users of the prediction and navigation engine will include insurers, TPAs, employers and third-parties providing services to them.

Employers that self-insure their health plans will have comorbidity data on their employees in their health plan data sets. The medical claims under the health plans, however, will be protected health information (PHI) under the Health Insurance Portability and Accountability Act (HIPAA). Accordingly, employers adding their health plan medical claims to the library to enrich it with comorbidity data may need to engage third-party service providers to insulate them from that PHI, which HIPAA generally precludes them from accessing and/or using.

The electronic health records (EHRs) shown in FIG. 5 and discussed below are also PHI.

Having trained on the library, the prediction and navigation engine now interfaces with the program or system into which the adjusters input or type their notes as depicted in the upper-left corner of FIG. 4.

As an adjuster types their initial notes on a new case, the engine analyzes the notes in real-time and matches the keywords, phrases and text that the adjuster uses against the keywords, phrases and text in the initial adjuster note entries for similar cases in the library.

The engine then predicts the medical claim costs and lost-wage indemnity payments for the new case based on the medical claim costs and lost-wage indemnity payments of those library cases, which predicted amounts may be expressed as a single number or as a range.

If the predicted medical claim costs and/or lost-wage indemnity payments exceed the established outlier threshold, the engine flags the new case as a potential outlier and sends a warning back to the program or system into which the adjuster is typing the notes. The engine may express this determination in terms of a probable level of confidence, e.g., 80% probability that the case will be an outlier (absent intervention), and may convey with this warning the predicted medical claim costs and lost-wage indemnity payments for the injury. Conversely, the engine may determine that the case will not be an outlier and express that conclusion in terms of a probable level of confidence, e.g., 90% probability that the case will not be an outlier. The engine may also send the determination that the case is not a potential outlier back to the program or system into which the adjuster is typing the notes, along with the predicted medical claim costs and lost-wage indemnity payments. When communicating back to the program or system into which the adjuster is typing the notes, the engine may use an LLM to construct the warning and convey back other information that the engine considers relevant.

Continuing the example from above, when predicting the medical claim costs and lost-wage indemnity payments on the new case the engine uses the averages and/or ranges for similar injuries in the library to make the prediction on the most granular level possible, e.g., knee injury on a male between 30 and 40 years old with a job description including manual labor that worked 5-10 overtime hours in the week preceding the injury on whom the initial adjuster note entries contain the terms "severe" and "ligament" in the same sentence, indicate that the employee has retained a lawyer, and express a negative sentiment.

Even if the library contains comorbidity data, the adjuster notes on the new case probably will not. When the library contains health plan data that includes the injured employee, however, the engine can double-back into the library and obtain the employee's comorbidity data there. Similarly, the engine can do so if the library contains another data set with the injured employee's comorbidities.

The engine can also double-back into the workers' compensation cases in the library to determine if the employee injured in the new case has had prior workers' compensation cases, and if so, what they were (as well as any injuries treated under the health plan). The engine can then use this information to refine the predictions further based on how such factors affected past workers' compensation cases in the library.

Continuing the above example, if the engine determines that the new case is the employee's third knee injury, the engine might increase the probability of an outlier to 99% with predicted medical claim costs of $175,000 and lost-wage indemnity payments of $125,000.

Figure 6:
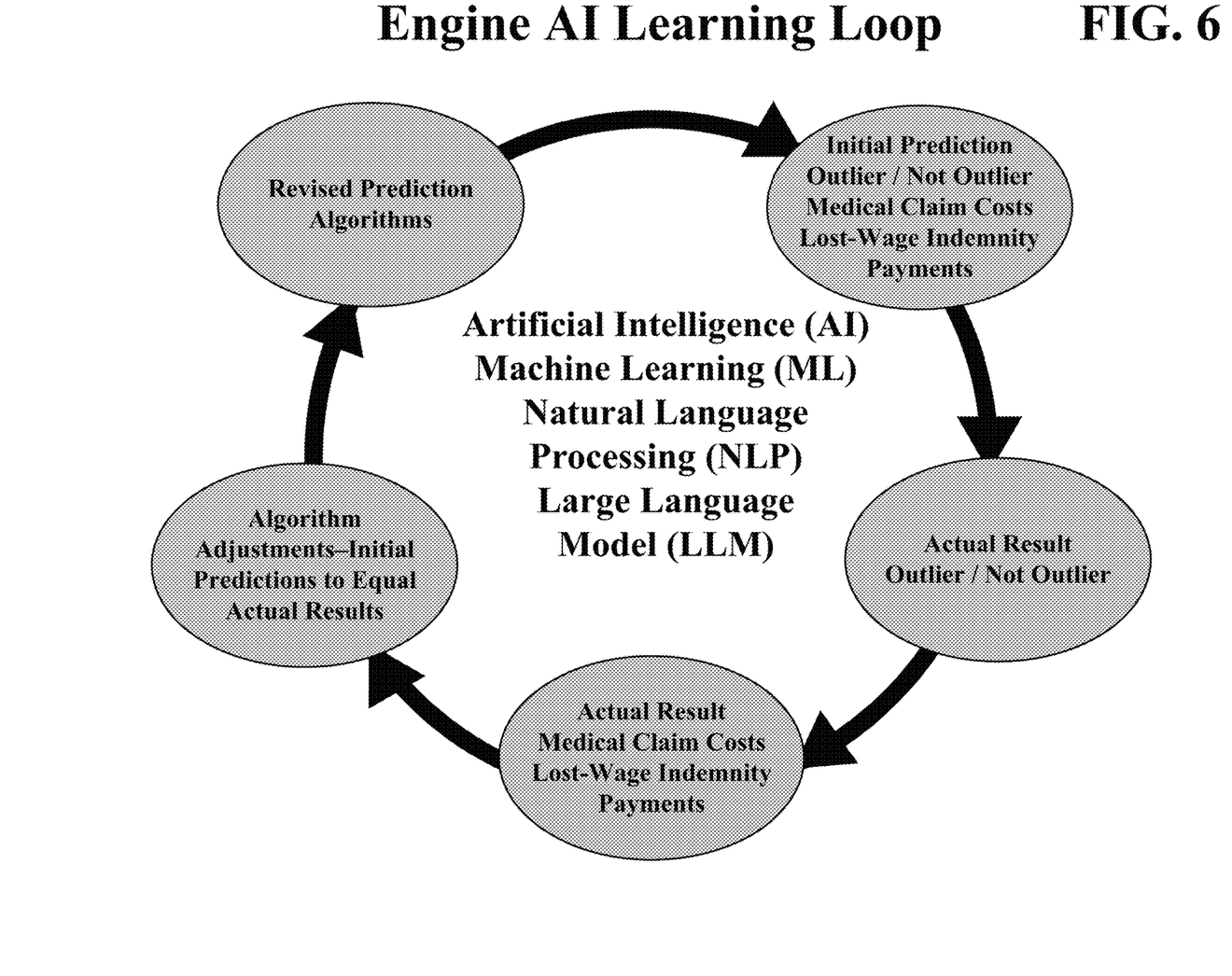
FIG. 6 shows how the prediction and navigation engine employs AI, ML and NLP in a learning loop by comparing the engine's predictions on a case against the subsequent actual results, and then uses that information to update the engine to provide better predictions in the future.

After the engine makes its predictions on a new case, the engine tracks the case's actual results as they are added to the library. FIG. 6 shows how the engine compares the predictions against those results and uses AI, ML, NLP, LLM and/or hyperparameter tuning techniques in a learning loop to refine the engine's prediction algorithms for future cases. The engine does so by determining what changes to the weights assigned to the factors in the algorithms, or to the algorithms themselves, would have caused the prediction in the new case to equal that case's subsequent actual results.

In addition to the above, the prediction and navigation engine can be applied to other costs on the historical cases in the library, such as lawyer fees and lump-sum indemnity payments, and then predict what those other costs will be on new cases.

In addition or alternative to the above, the prediction and navigation engine can be applied to health plans. In such a case, the engine substitutes: (1) the medical and pharmacy claims under the health plan for the medical and pharmacy claims of the workers' compensation cases; (2) the electronic health records (EHRs) maintained by providers documenting a patient's healthcare, including their diagnoses, procedures and prescriptions, for the adjuster notes; and (3) the absence and payroll data in the HR records for the lost-wage indemnity payments. For purposes of this disclosure, EHRs include electronic medical records (EMRs) to the extent that there is a difference.

This detailed description does not limit or represent an exhaustive enumeration of the disclosed principles. It will be apparent to those of skill in the art that numerous changes may be made in such details without departing from the spirit of the disclosed principles, and that the prediction and navigation engine does not require all the features described above to be deployed for the engine to function.

The invention claimed is:

1. A method in a computing environment for predicting the costs of workers' compensation cases based on the initial entries in the notes of the adjuster or other person administering the case (sometimes referred to as the "prediction and navigation engine" or the "engine"), the method comprising:

- presenting a visual navigation display on a computer screen for the user of a computer, along with a monitor and mouse, that represents categories and subcategories (and sub-subcategories, etc.) of material with functionally labeled circles or other images in a hierarchical order;
  - organizing that order with a central circle branching off into several smaller circles connected by stems, and from each of those smaller circles several more even smaller circles so connected, with more detailed subsets of the material as the circles descend;
  - displaying thumbnails of the dashboards and reports available under a circle when the user hovers the computer mouse's cursor over it;
  - accessing those dashboards and reports when the user clicks the mouse's cursor over the circle, or alternatively opening a particular dashboard or report directly when the user clicks on its thumbnail;
  - linking the color of each circle to the engine to indicate status or other factors, such as the addition of a new high-cost case;
- organizing the data on historical workers' compensation cases, including the adjuster notes, medical and pharmacy claims, and lost-wage indemnity payments, in databases arranged in tables and/or other schemas that permit the engine to extract and/or manipulate the data (sometimes referred to as the "library");
- employing artificial intelligence (AI), machine learning (ML) and/or natural language processing (NLP) technologies to categorize each case in the library, including by body part injured;
- employing AI, ML and/or NLP technologies to correlate the keywords, phrases and text in the early entries of the adjuster notes for each case in the library to the subsequent medical claim costs (including pharmacy) and lost-wage indemnity payments on that case;
- segregating the cases in the library between those that were high-cost in terms of medical claim costs, lost-wage indemnity payments or both (sometimes referred to as outliers), and those cases that were not high-cost, and/or expressing the outlier or non-outlier classification in terms of a probability that a case using certain keywords, phrases and text would be an outlier or not, based upon an outlier threshold set by the user;
- employing AI, ML and/or NLP to determine the average or ranges of medical claim costs, lost-wage indemnity payments or both, on the cases in the library (both outliers and non-outliers) based upon such keywords, phrases and text in the initial entries of the adjuster notes;
  - refining such averages and ranges with other relevant factors contained in the library, such as the injured employee's age, sex, job title and/or description and location;
  - refining further such averages and ranges based on whether the library contains other workers' compensation cases on the employee previous in time to the case in question, and whether those previous cases concerned the same or different body parts and/or injuries;
  - increasing such averages and ranges for inflation for the period between the incurrence of the cost and the present day;
- interfacing the prediction and navigation engine with the program or system into which the adjusters input and/or type their adjuster notes on new cases;
  - employing AI, ML and/or NLP on the initial entries of those adjuster notes in real-time as the adjuster inputs and/or types them to analyze and match the keywords, phrases and text used to the keywords, phrases and text in the library for similar injuries;
  - predicting the medical claim costs and lost-wage indemnity payments on the new case based on the costs and payments of the matching injuries in the library;
  - determining whether the new case is a potential outlier based on those predicted costs and payments, and if it is, sending a warning back to the program or system into which the adjuster is inputting or typing the notes to flag the case as a potential outlier, along with the predicted medical claim costs and lost-wage indemnity payments (which the engine may also do for a case not flagged as a potential outlier);
- adding each new case, including its adjuster notes, medical claim costs and lost-wage indemnity payments, to the library; and
- displaying the foregoing in dashboards and reports that may be organized and/or filtered by various metrics and/or combinations thereof, including outliers versus non-outliers, new cases versus historical cases, body part injured, periods, providers, job descriptions and/or functions, and employer locations and/or geographies.

2. The method of claim 1, further comprising:

adding other data sets to the library that contain information on the injured employees in the library, including employer human resource (HR) records, lump-sum indemnity payments, employee health and other assessments, surveys and questionnaires, health plan medical and pharmacy claims, electronic health records (EHRs), and other data sets;

organizing such additional data sets in databases arranged in tables and/or other schemas that permit the engine to extract and/or manipulate the data;

using AI, ML and/or NLP to refine the analysis of the library based upon the information contained in such additional new data sets, including risk-scoring the results when comorbidity data is available on the injured employees; and using AI, ML and/or NLP to refine each new case's predicted medical claim costs and lost-wage indemnity payments on the most granular level possible based on the information in the additional data sets, such as the comorbidities of the employee that is the subject of the new case.

3. The method of claim 2, further comprising:

tracking each new case and comparing its predicted medical claim costs and lost-wage indemnity payments to its actual medical claim costs and lost-wage indemnity payments; and employing AI, ML, NLP and/or hyperparameter tuning techniques in a learning loop to refine the engine's prediction algorithms for future cases, including by determining what changes to the weights assigned to the factors in the algorithms, or to the algorithms themselves, would have caused the prediction in the new case to equal that case's subsequent actual results.

4. The method of claim 3, further comprising:

applying the prediction and navigation engine to such other costs on the historical cases as may be in the library, such as lawyer fees and lump-sum indemnity payments; and employing the engine to predict such other costs on the new cases.

5. The method of claim 4, further comprising:

deploying the prediction and navigation engine in a health plan environment in addition, or in the alternative, to a workers' compensation environment by substituting:

(1) the medical and pharmacy claims under the health plan for the medical and pharmacy claims of the workers' compensation cases;

(2) the EHRs maintained by providers documenting a patient's healthcare, including their diagnoses, procedures and prescriptions, for the adjuster notes; and (3) the absence and payroll data in the HR records for the lost-wage indemnity payments.

6. A system in a computing environment for predicting the costs of workers' compensation cases based on the initial entries in the notes of the adjuster or other person administering the case (sometimes referred to as the "prediction and navigation engine" or the "engine"), the method comprising:

presenting a visual navigation display on a computer screen for the user of a computer, along with a monitor and mouse, that represents categories and subcategories (and sub-subcategories, etc.) of material with functionally labeled circles or other images in a hierarchical order;

organizing that order with a central circle branching off into several smaller circles connected by stems, and from each of those smaller circles several more even smaller circles so connected, with more detailed subsets of the material as the circles descend;

displaying thumbnails of the dashboards and reports available under a circle when the user hovers the computer mouse's cursor over it;

accessing those dashboards and reports when the user clicks the mouse's cursor over the circle, or alternatively opening a particular dashboard or report directly when the user clicks on its thumbnail;

linking the color of each circle to the engine to indicate status or other factors, such as the addition of a new high-cost case;

organizing the data on historical workers' compensation cases, including the adjuster notes, medical and pharmacy claims, and lost-wage indemnity payments, in databases arranged in tables and/or other schemas that permit the engine to extract and/or manipulate the data (sometimes referred to as the "library");

employing artificial intelligence (AI), machine learning (ML) and/or natural language processing (NLP) technologies to categorize each case in the library, including by body part injured;

employing AI, ML and/or NLP technologies to correlate the keywords, phrases and text in the early entries of the adjuster notes for each case in the library to the subsequent medical claim costs (including pharmacy) and lost-wage indemnity payments on that case;

segregating the cases in the library between those that were high-cost in terms of medical claim costs, lost-wage indemnity payments or both (sometimes referred to as outliers), and those cases that were not high-cost, and/or expressing the outlier or non-outlier classification in terms of a probability that a case using certain keywords, phrases and text would be an outlier or not, based upon an outlier threshold set by the user;

employing AI, ML and/or NLP to determine the average or ranges of medical claim costs, lost-wage indemnity payments or both, on the cases in the library (both outliers and non-outliers) based upon such keywords, phrases and text in the initial entries of the adjuster notes;

refining such averages and ranges with other relevant factors contained in the library, such as the injured employee's age, sex, job title and/or description and location;

refining further such averages and ranges based on whether the library contains other workers' compensation cases on the employee previous in time to the case in question, and whether those previous cases concerned the same or different body parts and/or injuries;

increasing such averages and ranges for inflation for the period between the incurrence of the cost and the present day;

interfacing the prediction and navigation engine with the program or system into which the adjusters input and/or type their adjuster notes on new cases;

employing AI, ML and/or NLP on the initial entries of those adjuster notes in real-time as the adjuster inputs and/or types them to analyze and match the keywords, phrases and text used to the keywords, phrases and text in the library for similar injuries;

predicting the medical claim costs and lost-wage indemnity payments on the new case based on the costs and payments of the matching injuries in the library;

determining whether the new case is a potential outlier based on those predicted costs and payments, and if it is, sending a warning back to the program or system into which the adjuster is inputting or typing the notes to flag the case as a potential outlier, along with the predicted medical claim costs and lost-wage indemnity payments (which the engine may also do for a case not flagged as a potential outlier);

adding each new case, including its adjuster notes, medical claim costs and lost-wage indemnity payments, to the library; and displaying the foregoing in dashboards and reports that may be organized and/or filtered by various metrics and/or combinations thereof, including outliers versus non-outliers, new cases versus historical cases, body part injured, periods, providers, job descriptions and/or functions, and employer locations and/or geographies.

7. The system of claim 6, further comprising:

adding other data sets to the library that contain information on the injured employees in the library, including employer human resource (HR) records, lump-sum indemnity payments, employee health and other assessments, surveys and questionnaires, health plan medical and pharmacy claims, electronic health records (EHRs), and other data sets;

organizing such additional data sets in databases arranged in tables and/or other schemas that permit the engine to extract and/or manipulate the data;

using AI, ML and/or NLP to refine the analysis of the library based upon the information contained in such additional new data sets, including risk-scoring the results when comorbidity data is available on the injured employees; and using AI, ML and/or NLP to refine each new case's predicted medical claim costs and lost-wage indemnity payments on the most granular level possible based on the information in the additional data sets, such as the comorbidities of the employee that is the subject of the new case.

8. The system of claim 7, further comprising:

tracking each new case and comparing its predicted medical claim costs and lost-wage indemnity payments to its actual medical claim costs and lost-wage indemnity payments; and employing AI, ML, NLP and/or hyperparameter tuning techniques in a learning loop to refine the engine's prediction algorithms for future cases, including by determining what changes to the weights assigned to the factors in the algorithms, or to the algorithms themselves, would have caused the prediction in the new case to equal that case's subsequent actual results.

9. The system of claim 8, further comprising:

applying the prediction and navigation engine to such other costs on the historical cases as may be in the library, such as lawyer fees and lump-sum indemnity payments; and employing the engine to predict such other costs on the new cases.

10. The system of claim 9, further comprising:

deploying the prediction and navigation engine in a health plan environment in addition, or in the alternative, to a workers' compensation environment by substituting:

(1) the medical and pharmacy claims under the health plan for the medical and pharmacy claims of the workers' compensation cases;

(2) the EHRs maintained by providers documenting a patient's healthcare, including their diagnoses, procedures and prescriptions, for the adjuster notes; and (3) the absence and payroll data in the HR records for the lost-wage indemnity payments.

\* \* \* \* \*